June 2, 1970  J. C. F. DAWKINS ET AL  3,514,826

HOLDER FOR A CUTTING TOOL BIT

Filed April 18, 1968

INVENTORS:-
JOHN CAMPBELL FRANCIS DAWKINS,
ROY ALFRED GAVED & ALAN GREIG

United States Patent Office 3,514,826
Patented June 2, 1970

3,514,826
HOLDER FOR A CUTTING TOOL BIT
John Campbell Francis Dawkins, Roy Alfred Gaved, and Alan Greig, Tonbridge, England, assignors to Diagrit Grinding Company Limited, Tonbridge, Kent, England
Filed Apr. 18, 1968, Ser. No. 722,403
Claims priority, application Great Britain, Apr. 18, 1967, 17,628/67; Aug. 15, 1967, 36,040/67
Int. Cl. B26d 1/00
U.S. Cl. 29—96
6 Claims

ABSTRACT OF THE DISCLOSURE

A cutting tool bit is held firmly against a locating face on a tool holder by a pin extending through parallel bores in the bit and the holder. The bore in the bit is further than the bore in the holder from the locating face so that when the stem of the pin is in the holder bore and the head of the pin is in the bit bore, the pin will be resiliently distorted and will force the bit against the locating face.

---

This invention relates to a holder for a cutting tool bit, and is applicable particularly, but not exclusively, to cutting tools used in lathes, shaping or planing machines. The invention is also applicable to a holder disclosed in our United States patent application No. 722,402, filed Apr. 18, 1968, and now abandoned.

It is well known for cutting tools to include a holder, a detachable cutting tool bit and often a seating member for the bit. Clamping means is arranged so that the bit may be clamped to the holder in different position so that fresh cutting edges are made available.

An object of this invention is to provide a holder having a cheap and simple clamping means.

According to the invention, a holder for a cutting tool bit has a seating face for supporting the bit, stop means for locating the bit on the seating face, a bore in the holder substantially normal to the seating face and positioned such that when the bit is placed on the seating face and abutting the stop means the holder bore will be eccentric to a bore formed in the bit and the axis of the holder bore will be positioned nearer the stop means than is the axis of the bit bore, the holder bore is of smaller diameter than the bit bore such that none of the holder bore is covered by the bit, and a pin comprises a stem which is a sliding fit in the holder bore and is joined by a neck of reduced thickness to a concentric head which before assembly is a sliding fit in the bit bore whereby, when the head is forced into the bit bore whilst the stem is in the holder bore, the head will be moved eccentric to the stem through resilient distortion of the neck so that a force will be generated urging the head and the surrounding cutting tool against the stop means.

According to a feature of the invention, the stop means may be a locating face substantially normal to the seating face for abutment by a corresponding face of the bit.

According to a further feature the holder may include a further locating face substantially normal to the seating face for abutment by a corresponding face of the bit, the two locating faces form a corner, and the axis of the holder bore is nearer the corner than is the axis of the bit bore whereby, when the pin is inserted in the bores, the bit will be urged into the corner. Preferably a seating member for supporting the bit is interposed between the holder and the bit, the seating member defines the seating face, and the holder bore is formed in the seating member whereby the latter is located by the pin to the holder.

According to another feature of the invention a portion of the pin may protrude out of the holder bore on the side remote from the seating face when the pin is in the position for holding the bit to the holder, and when the end of said protruding portion of the pin is pushed flush with the holder, the head of the pin will be raised to a position in which the bit may be removed easily from the holder. Preferably at least a length of the said protruding portion of the pin is longitudinally bifurcated and the sections thus formed are bent outwardly away from each other whereby the sections will be resiliently distorted together to grip the holder bore and retain the pin when the pin is in the position for releasing the bit.

The invention is now described, by way of example only, with reference to the accompanying drawings, as applied to a lathe tool.

Figure 1:
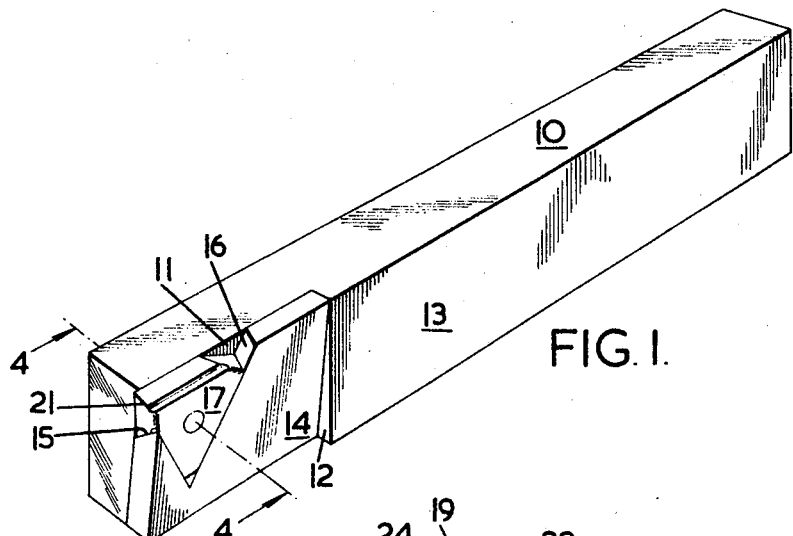
FIG. 1 is a perspective view of a lathe tool according to the invention.

In FIG. 1 a lathe tool has a rectangular section body 10, made of steel such as EN 24, on which is formed a partially recessed first face 11 which may be at a small angle 12 to one of the principal faces 13 of the body 10. A seating member 14 of hard steel, such as EN 30B, is fastened to part of the first face 11 by a suitable method such as brazing, silver soldering or by an adhesive.

Second and third faces 15 and 16 respectively are formed on the seating member 14 and are inclined towards the first face 11. Furthermore the line of intersection of the first face 11 with the second face 15 is inclined to the line of intersection of the first face 11 with the third face 16. The first, second and third faces 11, 15, 16 constitute a partial pocket for holding a cutting tool bit 17. In the examples shown in the drawings the angle between the said two lines of intersection is 60°

Figure 2:
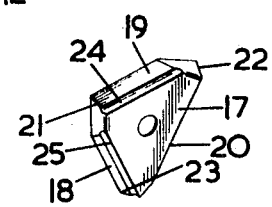
FIG. 2 is a perspective view of a cutting tool bit.

In FIG. 2 the bit 17 is of equilateral triangular shape and is formed with an unseen first bit face for engaging against the first holder face 11 of the body 10. The triangle is formed by second, third and fourth bit faces 18, 19, 20 respectively which have the same inclination to the first bit face as the second holder face 15 and the third holder face 16 have to the first holder face 11. In this way the bit 17 may be placed in the pocket in any one of three positions in which a pair of the second, third and fourth bit faces 18, 19, 20 will engage against the second and third faces 15, 16 whereby to locate the bit 17 in the pocket in a firm and accurate manner.

The bit 17 is formed from a standard triangular tool bit made typically of tungsten carbide or other material suitable for the material to be cut. The apices of the triangle are ground away to form cutting edges 21, 22, 23 of the desired shape, for example that of a thread form for screwcutting. If desired the bit 17 may have chip breaking grooves 24, 25. If the bit 17 is of constant thickness the angle 12 will give a suitable side clearance angle for the material to be cut.

In normal turning the surface to be cut will be moving generally downwards relative to the cutting edge 21 in FIG. 1 so that the principal cutting forces on the bit 17 will be downwards and towards the body 10 thereby urging the bit 17 firmly into the pocket.

Figure 3:
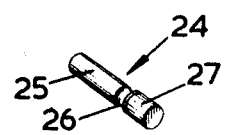
FIG. 3 is a perspective view of a clamping pin.
Figure 4:
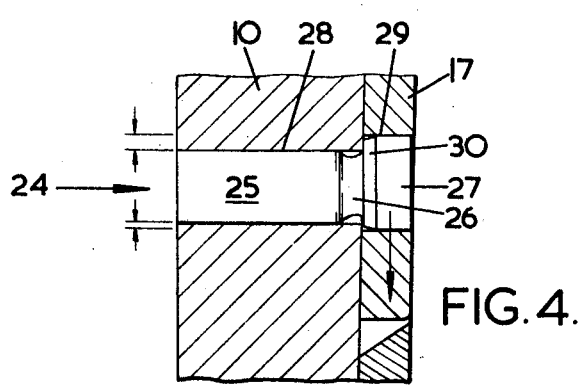
FIG. 4 is a part section in a vertical plane including the line 4—4 in FIG. 1.

To ensure retention of the bit 17 in the pocket, for example when removing swarf, the bit 17 and the body 10 are engaged by a pin 24 in FIG. 3. Before assembly the pin 24 has a stem 25 joined by a neck 26, of reduced section, to a concentric head 27 of greater diameter than the stem 25. The stem 25 is a sliding fit in a bore 28 formed in the body 10 and before assembly the head 27 is a sliding fit in a bore 29 formed in the centre of the bit 17. As may be seen in FIG. 4 the bore 28 is displaced relative to the bore 29 towards the junction of the second and third holder faces 15, 16 to an extent which leaves the bore 28 completely uncovered by the bit 17. When the pin 24 is forced into the body 10 and the bit 17, the neck 26 is distorted, which generates a force urging the head 27 and therefore the bit 17 towards the said junction of the faces 15, 16. A chamfer 30 eases the entry of the head 27 into the bore 29.

Figure 5:
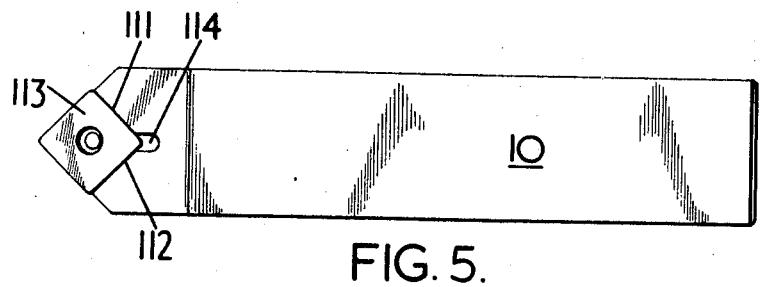
FIG. 5 is a plan view of an alternative embodiment of the invention.

In FIG. 5 the holder has locating faces 111, 112 for locating the tool steel bit 113. A recess 114 in the body 10 facilitates cleaning and correct seating of the bit 113.

Figure 6:
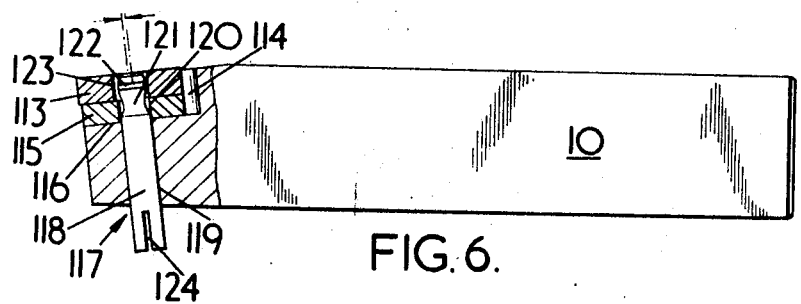
FIG. 6 is a part section in elevation of FIG. 5.
Figure 7:
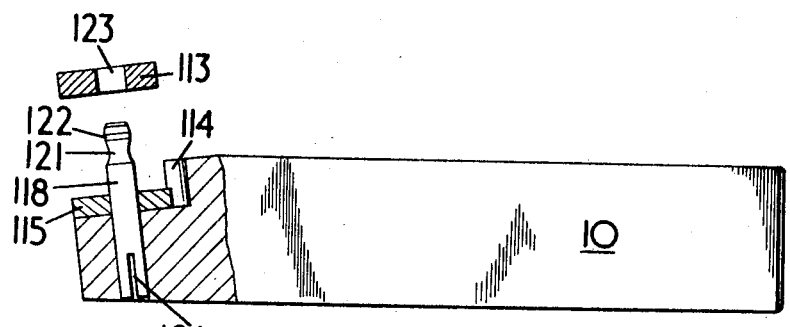
FIG. 7 shows a different phase of operation of FIG. 6.

In FIG. 6 a ground hard steel seating member 115 rests on a seating face 116 of the body 10, and supports the bit 113. The locating faces 111, 112 are substantially normal to the seating face 116. A steel pin 117 has a stem 118 which is a sliding fit in the bores 119, 120 in the body and the seating member respectively substantially normal to the seating face 116. The stem 118 is joined by a neck 121, of reduced section, to a head 122 which before assembly is concentric with the stem 118. The head 122 is a sliding fit in a bore 123 in the bit 113.

The bore 123 has its axis parallelly spaced from the axis of the bore 119 in the direction away from the corner formed between the locating faces 111, 112. The eccentricity is such that when the bit 113 abuts the locating faces 111, 112 the bore 119 is completely uncovered by the bit 113. When the pin 117 is forced into the body 10 and the bit 113, the neck 121 is distorted, which generates a force urging the head 122 and the bit 113 towards the corner of the faces 111, 112. The head is chamfered to ease its entry into the bore 123 in the bit 113.

When in the assembled position, the stem 118 protrudes from the body, the protruding portion has a longitudinal bifurcation 124 and the sections thus formed are bent outwardly away from each other. To remove the bit 113 the protruding portion of the stem 118 is tapped into the body 10 so that the head 122 is disengaged from the bore 123, whereupon the bit 113 becomes released and may be lifted off the pin 117. The bifurcated end of the stem 118 grips inside the bore 119 to hold the pin 117, which also retains the seating member 115.

Although the bit 113 is shown as square it could equally be of any other well known shape such as triangular or circular and could be located against a single face if preferred, in which case the eccentricity of the bores would be arranged so that the pin would urge the bit against the single face.

What we claim as our invention and desire to secure by Letters Patent of the United States is:

1. A holder defining a seating face for supporting a cutting tool bit, said cutting tool bit defining a bore, and said holder having stop means for locating the bit on the seating face, wherein the invention comprises the holder defining a bore, the axis of said holder bore being substantially normal to the seating face and nearer to said stop means than is the axis of the bore in the bit when the latter is placed on said seating face and abutting said stop means, the holder bore being of smaller diameter than the bit bore such that none of the holder bore is covered by the bit, a pin comprises a stem, a concentric head and an intermediate neck of reduced thickness, the stem and the head are sliding fits in the holder bore and the bit bore respectively, whereby when the head is forced into the bit bore whilst the stem is in the holder bore, the head will be moved eccentric to the stem through resilient distortion of the neck so that a force will be generated urging the head and the surrounding bit against the stop means.

2. A holder, as in claim 1, defining a locating face constituting said stop means, and said locating face is substantially normal to the seating face for abutment by a corresponding face of the bit.

3. A holder, as in claim 2, defining a further locating face substantially normal to the seating face for abutment by a corresponding face of the bit, the two locating faces define a corner, and the axis of the holder bore is nearer the corner than the axis of the bit bore whereby, when the pin is inserted in the bores, the bit will be urged into the corner.

4. A holder, as in claim 1, in which a seating member defining the seating face is interposed between the holder and the bit for supporting the bit, and the holder bore is formed in the seating member whereby the latter is located by the pin to the holder.

5. A holder, as in claim 1, in which a portion of the pin protrudes out of the holder bore on the side remote from the seating face when the pin is in the position for holding the bit to the holder, and when the end of said protruding portion of the pin is pushed flush with the holder, the head of the pin will be raised to a position in which the bit may be removed easily from the holder.

6. A holder, as in claim 5, in which at least a length of the said protruding portion of the pin is longitudinally bifurcated and the sections thus formed are bent outwardly away from each other whereby the sections will be resiliently distorted together to grip the holder bore and retain the pin when the pin is in the position for releasing the bit.

References Cited

UNITED STATES PATENTS

| | | | |
|---|---|---|---|
| 104,055 | 6/1870 | Munro et al. | 29—105 |
| 1,838,520 | 12/1931 | Archer | 29—98 |
| 2,838,827 | 6/1958 | Wright | 29—96 |
| 3,138,847 | 6/1964 | Berry | 29—105 |
| 3,310,859 | 3/1967 | Diemond et al. | 29—96 |
| 3,436,799 | 4/1969 | Kopy | 29—96 |

HARRISON L. HINSON, Primary Examiner